(12) United States Patent
Higaki et al.

(10) Patent No.: US 6,282,632 B1
(45) Date of Patent: Aug. 28, 2001

(54) INFORMATION PROCESSOR HAVING DUPLICATE OPERATION FLAGS

(75) Inventors: Nobuo Higaki, Osaka; Tetsuya Tanaka, Ibaraki; Shuichi Takayama, Takarazuka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/143,943

(22) Filed: Aug. 31, 1998

(30) Foreign Application Priority Data

Aug. 29, 1997 (JP) ................................................. 9-234357

(51) Int. Cl.[7] ........................................................ G66F 9/00
(52) U.S. Cl. ............................................ 712/42; 712/234
(58) Field of Search ............................. 712/23, 24, 233, 712/234, 236, 42, 43

(56) References Cited

U.S. PATENT DOCUMENTS

| 4,809,169 | * | 2/1989 | Sfarti et al. | 712/20 |
|---|---|---|---|---|
| 5,125,092 | * | 6/1992 | Prener | 395/706 |
| 5,625,835 | * | 4/1997 | Ebcioglu et al. | 712/23 |
| 5,805,850 | * | 9/1998 | Luick | 712/215 |
| 5,991,868 | * | 11/1999 | Kamiyama et al. | 712/32 |

* cited by examiner

*Primary Examiner*—Larry D. Donaghue
(74) *Attorney, Agent, or Firm*—Price and Gess

(57) ABSTRACT

The processor according to the present invention includes a flag register that stores a first flag group and a second flag group. The second flag group includes the same operation flags (a carry flag and an overflow flag) as the first flag group. The processor executes first-type instructions and second-type instructions. The first-type instruction instructs to perform an operation and to update the first flag group according to the result of the operation. The second-type instruction instructs to perform an operation different from the operation in the first-type instruction and updates the second flag group according to the result of the operation.

27 Claims, 9 Drawing Sheets

FIG. 1A (PRIOR ART)

add D, A, B : ADD DATA ON REGISTERS A AND B, AND STORE RESULT ON REGISTER D
add. D, A, B : ADD DATA ON REGISTERS A AND B, STORE RESULT ON REGISTER D, AND UPDATE FLAGS ON REGISTER CR
addo D, A, B : ADD DATA ON REGISTERS A AND B, STORE RESULT ON REGISTER D, AND UPDATE FLAGS ON REGISTER XER
addo. D, A, B : ADD DATA ON REGISTERS A AND B, STORE RESULT ON REGISTER D, AND UPDATE FLAGS ON REGISTERS CR AND XER

FIG. 1B (PRIOR ART)

CONDITION REGISTER (CR)

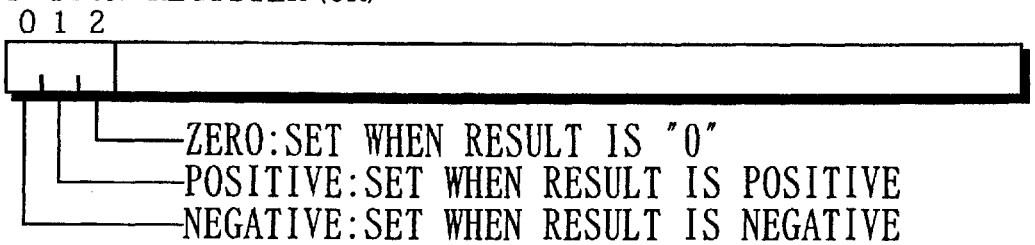

- ZERO : SET WHEN RESULT IS "0"
- POSITIVE : SET WHEN RESULT IS POSITIVE
- NEGATIVE : SET WHEN RESULT IS NEGATIVE

INTEGER EXCEPTION REGISTER (XER)

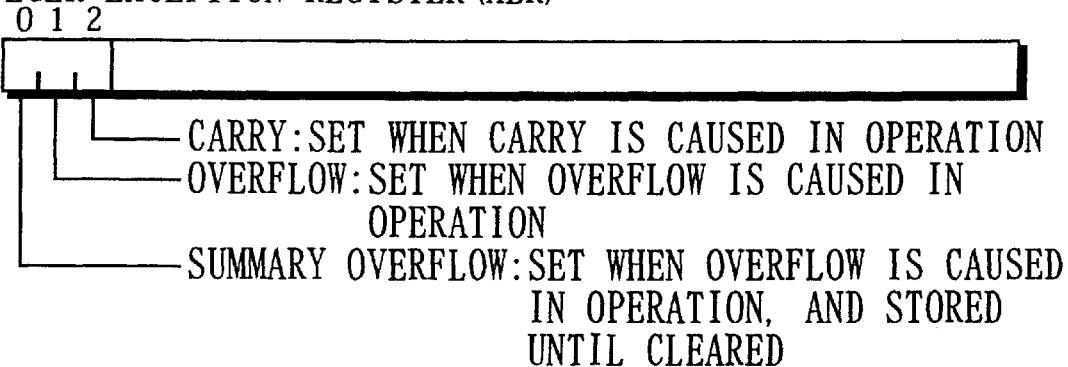

- CARRY : SET WHEN CARRY IS CAUSED IN OPERATION
- OVERFLOW : SET WHEN OVERFLOW IS CAUSED IN OPERATION
- SUMMARY OVERFLOW : SET WHEN OVERFLOW IS CAUSED IN OPERATION, AND STORED UNTIL CLEARED

FIG. 3

| INSTRUCTION | OPERATION | C | V | N | Z | CA | OV |
|---|---|---|---|---|---|---|---|
| mov (A), B<br>mov A, (B)<br>.. | Mem(A) → RegB<br>RegA → Mem(B)<br>.. | × | × | × | × | × | × |
| cmp A, B<br>cmpm A, B<br>cmpi A, imm<br>.. | A − B<br>Mem(A) − Mem(B)<br>A − imm<br>.. | ◎ | ◎ | ◎ | ◎ | × | × |
| add D, A, B<br>sub D, A, B<br>and D, A, B<br>or D, A, B<br>.. | A + B → D<br>A − B → D<br>A and B → D<br>A or B → D<br>.. | × | × | × | × | ◎ | ◎ |
| bcs target<br>bcc target<br>bvs target<br>bvc target<br>bns target<br>bnc target<br>bzs target<br>bzc target<br>.. | WHEN C=1, PROGRAM IS BRANCHED TO ADDRESS "TARGET"<br>WHEN C=0, PROGRAM IS BRANCHED TO ADDRESS "TARGET"<br>WHEN V=1, PROGRAM IS BRANCHED TO ADDRESS "TARGET"<br>WHEN V=0, PROGRAM IS BRANCHED TO ADDRESS "TARGET"<br>WHEN N=1, PROGRAM IS BRANCHED TO ADDRESS "TARGET"<br>WHEN N=0, PROGRAM IS BRANCHED TO ADDRESS "TARGET"<br>WHEN Z=1, PROGRAM IS BRANCHED TO ADDRESS "TARGET"<br>WHEN Z=0, PROGRAM IS BRANCHED TO ADDRESS "TARGET" | ○○×××××× | ××○○×××× | ××××○○×× | ××××××○○ | ×××××××× | ×××××××× |
| bcas target<br>bcac target<br>bovs target<br>bovc target<br>.. | WHEN CA=1, PROGRAM IS BRANCHED TO ADDRESS "TARGET"<br>WHEN CA=0, PROGRAM IS BRANCHED TO ADDRESS "TARGET"<br>WHEN OV=1, PROGRAM IS BRANCHED TO ADDRESS "TARGET"<br>WHEN OV=0, PROGRAM IS BRANCHED TO ADDRESS "TARGET" | ×××× | ×××× | ×××× | ×××× | ○○×× | ××○○ |

INFORMATION PROCESSOR HAVING DUPLICATE OPERATION FLAGS

BACKGROUND OF THE INVENTION (1) Field of the Invention

The present invention relates to an information processor that has an operation flag register reflects the result of an operation in an instruction by updating operation flags.

(2) Description of the Related Art

Recently, information processors, for instance, microcomputers, have been drastically developed and used in a variety of fields.

Generally speaking, an information processor increases the throughput by executing a plurality of instructions in such as the VLIW (Very Long Instruction Word) and the superscalar method in parallel.

A conventional information processor includes a flag register for storing operation flags, for instance, a carry flag or an overflow flag. When executing an arithmetical instruction, the conventional information processor creates operation flags and updates the flag register. The conventional information processor refers to an operation flag that is the condition in a conditional branch instruction. As a result, the compiler or the assembler for the information processor has to schedule the instructions in a program so that an arithmetical instruction that changes the operation flags is not executed between an arithmetical instruction and a conditional branch instruction.

It is pretty much difficult for the compiler or the assembler to schedule such instructions for a processor that executes instructions in parallel in order to increase the throughput (for instance, a VLIW processor).

An information processor for which a compiler may schedule instructions easily without changing operation flags has developed. Such an information processor includes a plurality of operation flag registers, and each of the instructions designates a flag register that is to be updated (refer to, for instance, "PowerPC601 User's Manual, IBM Microelectronics").

FIGS. 1A and 1B show the specification of arithmetical instructions of the conventional information processor and the construction of the operation flag registers.

The information processor includes two flag registers, that is, flag register CR (Condition Register) and flag register XER (Integer Exception Register) shown in FIG. 1B. The flags are set in these registers as shown in FIG. 1B.

For the information processor, four different arithmetical instructions that perform the same arithmetical operation are prepared (FIG. 1A shows only add instructions).

FIG. 1A shows when a period "." is added to the mnemonic ("add"), the operation flag in flag register CR is updated, and when the alphabet "o" is added to the mnemonic, the operation flag in flag register XER is updated.

For one add instruction, four kinds of instruction are prepared. The instruction to update no flag register, the instruction to update flag register CR, the instruction to update flag register XER, and the instruction to update flag register CR and flag register XER are prepared.

It is easy for the compiler or the assembler to schedule instructions using such instructions. For instance, it is easy to arrange an arithmetical instruction to update no flag register between an arithmetical instruction to update flag register CR and a conditional branch instruction.

According to the conventional art, however, the length of an instruction code and the code size are increased since one of four instruction codes (op (operation) codes) has to be assigned to an instruction depending on which flag register should be updated.

For instance, an instruction code for a "PowerPC601" processor is lengthy. This is because one bit of field showing whether a period "." is included and another one bit of field showing whether the alphabet "o" is included are set in almost all such instruction codes.

A plurality of methods for updating operation flags are prepared for each instruction. As a result, a relatively large-scale hardware is necessary for the instruction decoder.

In addition, the operation flag register that is to be updated has to be designated for each instruction according to the conventional art. As a result, when instruction codes are assigned to instructions, the length of the field for designating the operation is increased, and consequently the code size is increased.

SUMMARY OF THE INVENTION

It is accordingly an object of the present invention to provide an information processor that does not increase the code sizes of instruction codes and a program, prevents the hardware size of an instruction decoder from increasing, and enables a compiler or an assembler to schedule instructions easily.

The above-mentioned object is achieved by a processor may include: a flag register for storing a first flag group and a second flag group that includes same kinds of operation flags as the first flag group; an instruction decoding unit for decoding at least two types of instructions, a first-type instruction and a second-type instruction, wherein operations in the first-type and the second-type instructions are different; an execution unit for executing an instruction according to a decoding result and for creating flag data based on an execution result of the instruction; a first update unit for updating, when the first-type instruction has been decoded, the first flag group using the created flag data; and a second update unit for updating, when the second-type instruction has been decoded, the second flag group using the created flag data.

The object may also be achieved by the processor, wherein first-type instructions include compare instructions that compare register data, and second-type instructions include arithmetic logic operation instructions and no compare instruction.

The object may also be achieved by the processor, wherein the second flag group includes a carry flag and an overflow flag as the operation flags of the same kinds as the operation flags in the first flag group.

The object may also be achieved by the processor, wherein the instruction decoding unit activates a flag update signal when decoding an instruction that updates an operation flag, and when decoding the first-type instruction, activates a first-type signal that indicates that a decoded instruction is the first-type instruction, the first update unit updates the first flag group when the flag update signal and the first-type signal are activated, and the second update unit updates the second flag group when the flag update signal is activated and the first-type signal is not activated.

In this construction, whether the first flag group or the second flag group stores the flag data that is created in an operation depends on whether a first-type instruction or a second-type instruction is decoded. In other words, whether the first flag group or the second flag group that include the same kinds of operation flags is updated depends on the instruction type. As a result, it is possible for the processor to use flag groups properly that have the same kinds of flags without increasing the length of instruction codes and the code size of a program.

When decoding an instruction, the instruction decoder judges whether a first-type instruction or a second-type instruction is decoded. As a result, it is possible to realize the processor with low cost without increasing the hardware size of the decoder.

In addition, it is possible for the processor to use the flag groups properly, so that the processor may enable the compiler or the assembler to schedule instructions easily.

The object may be achieved by the processor may further include a branch judgement unit for judging, when the first-type conditional branch instruction has been decoded, a condition using the first flag group, and for judging, when the second-type conditional branch instruction has been decoded, a condition using the second flag group.

In this construction, when executing an operation in which flags are referred to, the processor may use flag groups properly according to the type of the instruction. In other words, the flag group that is referred to depends on whether a first-type conditional branch instruction or a second-type conditional branch instruction is decoded. As a result, the processor may enable the compiler to schedule instructions easily.

The object may be achieved by the VLIW processor in a processor may include: a flag register for storing a first flag group and a second flag group that includes same kinds of operation flags as the first flag group; an instruction decoding unit for decoding a Very Long Instruction Word (called "VLIW" hereinafter) instruction that includes a format code field and a plurality of instruction fields, wherein a first-type instruction and a second-type instruction are located in a predetermined instruction field in the VLIW instruction; a plurality of execution unit for executing a plurality of instructions in the VLIW instruction according to a decoding result, wherein an execution unit respectively corresponding to the predetermined instruction field create flag data based on results of the first-type and second-type instructions; a first update unit for updating, when the first-type instruction in the predetermined instruction field has been decoded, the first flag group using flag data created from a result of the first-type instruction; and a second update unit for updating, when the second-type instruction in the predetermined instruction field has been decoded, the second flag group using flag data created from a result of the second-type instruction.

The object may also be achieved by the VLIW processor in the processor, wherein first-type instructions include compare instructions that compare register data, and second-type instructions include arithmetic logic operation instructions and no compare instruction.

The object may also be achieved by the VLIW processor in the processor, wherein the second flag group includes a carry flag and an overflow flag as the operation flags of the same kinds as the operation flags in the first flag group.

The object may also be achieved by the VLIW processor in the processor, wherein the instruction decoding unit activates a flag update signal when decoding an instruction that updates an operation flag, and when decoding the first-type instruction, activates a first-type signal that indicates that a decoded instruction is the first-type instruction, the first update unit updates the first flag group when the flag update signal and the first-type signal are activated, and the second update unit updates the second flag group when the flag update signal is activated and the first-type signal is not activated.

In this construction, the operations of a first-type instruction and a second-type instruction are executed in predetermined execution unit. The first update unit and the second update unit update the first flag group and the second flag group, respectively according to the flag data obtained from the predetermined execution unit. As a result, the VLIW processor may be realized without increasing the hardware size of the instruction decoder.

The compiler for the VLIW processor may set an instruction to update flags in the predetermined instruction field and an instruction to refer to flags in another instruction field in a VLIW instruction. As a result it is possible for the compiler to set instructions included in a VLIW instruction easily. It is also possible for the compiler to rearrange instructions easily to keep the order of an instruction that updates flags and an instruction that refers to flags.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 1A shows the specification of arithmetical instructions of a conventional information processor;

FIG. 1B shows the register construction of the operation flag register in a conventional information processor;

FIG. 3 shows the instruction specification of the processor according to the present invention;

DESCRIPTION OF THE PREFERRED EMBODIMENTS

[The First Embodiment]

An information processor according to the first embodiment is described below with reference to FIGS. 2 to 6.

[Flag Register]

Figure 2:
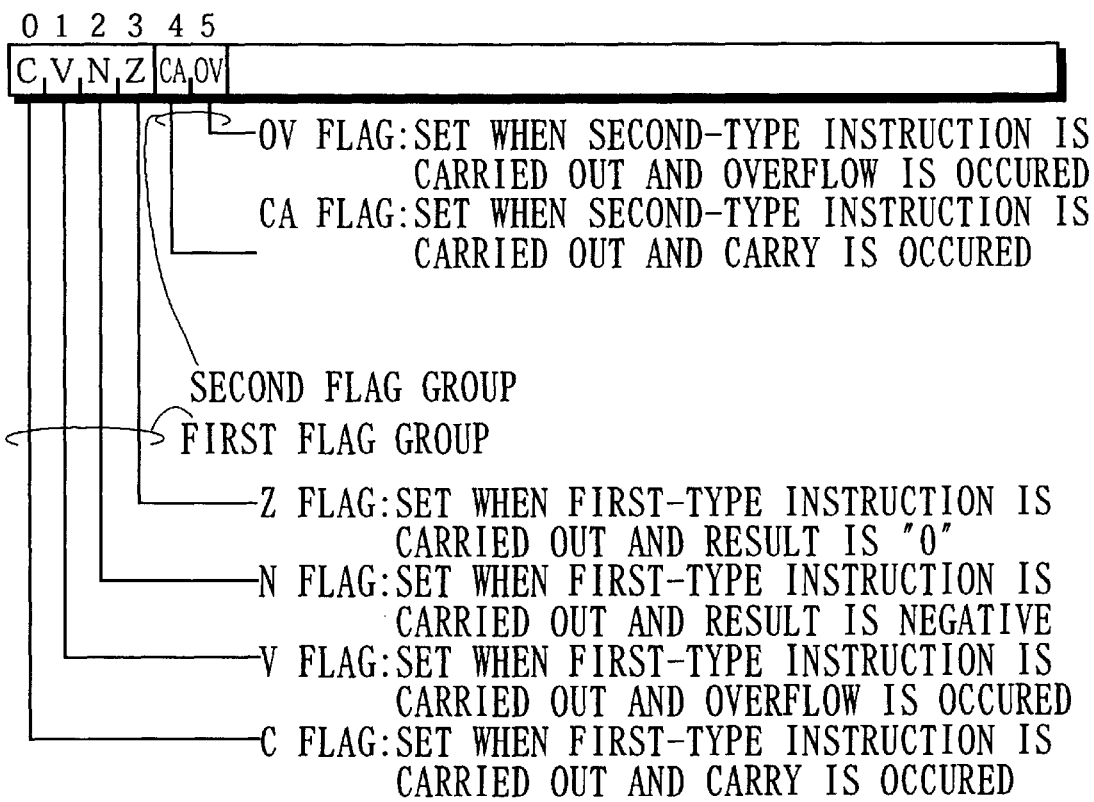
FIG. 2 shows the register construction of the operation flag register in a processor according to the first embodiment of the present invention.

FIG. 2 shows the bit configuration of flag register FR included in an information processor (hereinafter, the information processor is called a "processor") according to the first embodiment of the present invention.

As shown in FIG. 2, flag register FR is to store the first flag group and the second flag group. Although the first and second flag groups include the same kinds of operation flags, the same kinds of flags reflect the result of different instructions.

The first flag group includes the operation flags that are updated when a first-type instruction (a compare instruction) is executed. The first flag group includes a C flag, a V flag, an N flag, and a Z flag as shown in FIG. 2. The C flag is set when a carry is occurred, the V flag is set when an overflow is occurred, the N flag is set when the result is negative, and the Z flag is set when the result is "0".

The second flag group includes operation flags that are updated when a second-type instruction (the instruction that is not compare instructions and updates operation flags) is executed. The second flag group includes a CA flag and an OV flag. The CA flag is set when a carry is occurred, and the OV flag is set when an overflow is occurred.

Stored in the same register as shown in FIG. 2, the first and second flag groups may be stored in different registers.

[Instruction Specification]

FIG. 3 shows the instruction specification of the processor according to the first embodiment.

In FIG. 3, part of transfer instruction group 20, compare instruction group 21, arithmetic logic operation instruction group 22, first branch instruction group 23, and second branch instruction group 24 out of all of the instructions of the processor are described. In FIG. 3 the instruction (in mnemonic form), the contents of the operation, and the information on the C flag, the V flag, the N flag, the Z flag, the CA flag, and the OV flag are shown for each of the instructions. In FIG. 3, an "A" and a "B" represent registers, "(A)" represents the memory data for which addressing is performed in register A. A "target" represents the address to which a program is branched. A "⊚" indicates that the flag is to be updated, a "○" indicates that the flag is to be referred, and an "X" indicates that the flag is not to be updated and referred to.

Transfer instructions 20 for data transfer between a register and a memory are shown in transfer instruction group 20 in FIG. 3. Such a transfer instruction updates no flag in the first and second flag groups. A transfer instruction for data transfer between registers or memories (not shown in FIG. 3) also updates no flag in the first and second flag groups.

Compare instruction group 21 consists of first-type instructions that update the C flag, the V flag, the N flag, and the Z flag according to the arithmetic results (comparison results). Each of the compare instructions instructs the processor to perform a subtraction of data, not to store the subtraction result in any register or any memory, and to update the flags in the first flag group.

A compare instruction "cmp A,B" is a register compare instruction in which the flags in the first flag group reflect the result of the subtraction "A−B" of register data.

A compare instruction "cmpm A,B" is a memory compare instruction in which the flags in the first flag group reflect the result of the subtraction "(A)−(B)" of memory data.

In a compare instruction "cmpi A,imm", the flags in the first flag group reflect the result of the register data subtraction of immediate data from register data.

Compare instruction group 21 includes other compare instructions that are not shown in FIG. 3. For instance, a compare instruction "cmpa" in which addresses are compared is included in compare instruction group 21.

Arithmetic logic operation instruction group 22 consists of second-type instructions that update the CA flag and the OV flag according to the arithmetic results.

In arithmetic logic operation instructions "add D,A,B", "sub D,A,B", "and D,A,B", and "or D,A,B", an addition, a subtraction, a logical product, and a logical add are performed, respectively on register data "A" and "B", and the flags in the second flag group reflect the arithmetic results. Arithmetic logic operation instruction group 22 includes an arithmetic logic operation instruction in which memory data or immediate data are the operands and an arithmetic logic operation instruction that includes a shift, multiplication, divide, or a bit manipulation.

First branch instruction group 23 consists of the conditional branch instructions in which the flags in the first flag group are the conditions. When the value of the Z flag is "1" in a conditional branch instruction "bzs target", when the value of the Z flag is "0" in a conditional branch instruction "bzc target", when the value of the N flag is "1" in a conditional branch instruction "bns target", when the value of the N flag is "0" in a conditional branch instruction "bnc target", when the value of the C flag is "1" in a conditional branch instruction "bcs target", when the value of the C flag is "0" in a conditional branch instruction "bcc target", when the value of the V flag is "1" in a conditional branch instruction "bvs target", and when the value of the V flag is "0" in a conditional branch instruction "bvc target", the program is branched to the address represented by the "target".

Second branch instruction group 24 includes the conditional branch instructions in which the flags in the second flag group are the conditions. When the value of the CA flag is "1" in a conditional branch instruction "bcas target", when the value of the CA flag is "0" in a conditional branch instruction "bcac target", when the value of the OV flag is "1" in a conditional branch instruction "bovs target", and when the value of the OV flag is "0" in a conditional branch instruction "bovc target", the program is branched to the address represented by the "target".

A control instruction and the like are included in none of the instruction groups which have been described.

[Construction of Processor]

Figure 4:
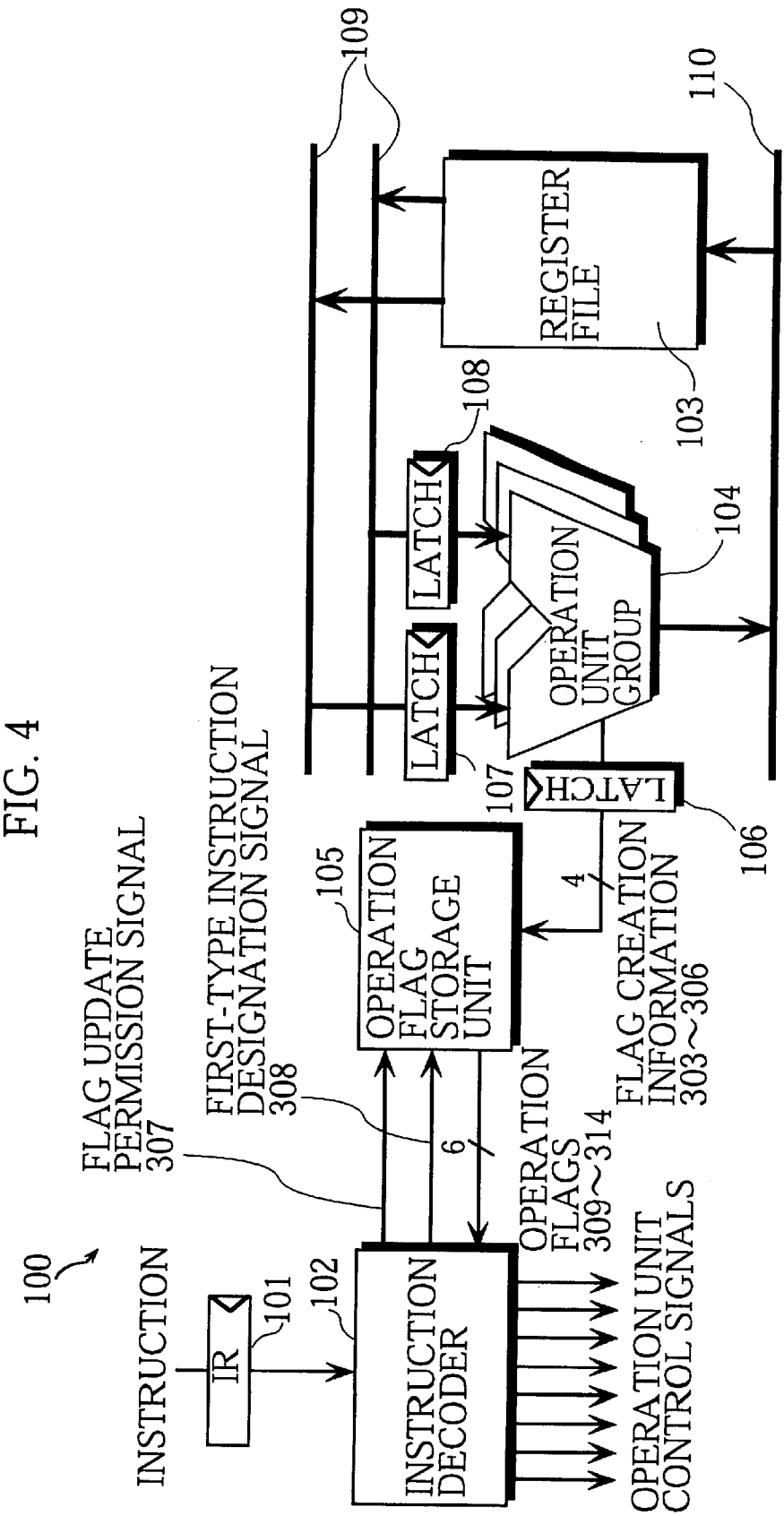
FIG. 4 is a block diagram showing the structure of the main part of a processor according to the first embodiment of the present invention.

FIG. 4 is a block diagram showing the structure of the main part of processor 100 according to the first embodiment of the present invention.

Processor 100 includes instruction register 101, instruction decoder 102, register file 103, operation unit group 104, operation flag storage unit 105, latches 106 to 108, and buses 109 and 110.

Instruction register 101 stores the instructions fetched from a memory (not illustrated) in order.

Instruction decoder 102 decodes the instructions stored in instruction register 101, and outputs control signals for controlling the execution of the instructions and the creation of operation flags. When decoding an instruction in compare instruction group 21 (first-type instructions) and when decoding an arithmetic logic operation instruction group 22 (second-type instructions) shown in FIG. 3, instruction decoder 102 makes flag update permission signal 307 effective. Flag update permission signal 307 allows operation flags to be updated. When decoding an instruction in compare instruction group 21, instruction decoder 102 makes first-type instruction designation signal 308 effective. First-type instruction designation signal 308 indicates that the decoded instruction is a first-type instruction.

Register file 103 is composed of a plurality of 32 bits of general purpose registers. Register file 103 outputs register data to bus 109 and stores the data on bus 110 under the control of instruction decoder 102.

Operation unit group 104 includes a plurality of operation units. Operation unit group 104 executes the operation designated by the operation code of an instruction and outputs flag creation information that is necessary to create operation flags according to the operation result under the control of instruction decoder 102. The plurality of operation units are arithmetic logic operation units, load/store units, shifters, and the like. More specifically, operation unit group 104 fetches the data on bus 109 via latches 107 and 108, outputs the result of the operation by one of the plurality of operation units to bus 110, and outputs flag creation information via latch 106.

The flag creation information stored in latch 106 is four bits of information, and includes four kinds of one bit of information. The flag creation information includes carry information 303 for showing that a carry is occurred when an arithmetic is performed, overflow information 304 for showing that an overflow is occurred when an arithmetic is performed, negative information 305 for showing that the arithmetic result is negative, and zero information 306 for showing that the arithmetic result is "0".

Operation flag storage unit 105 creates and updates the first flag group or the second flag group in the operation flag register according to the two control signals, that is, flag update permission signal 307 output from instruction decoder 102 and first-type instruction designation signal 308 and based on flag creation information 303 to 306 output from operation unit group 104 via latch 106.

[Detailed Construction of Operation Flag Storage Unit 105]

Figure 5:
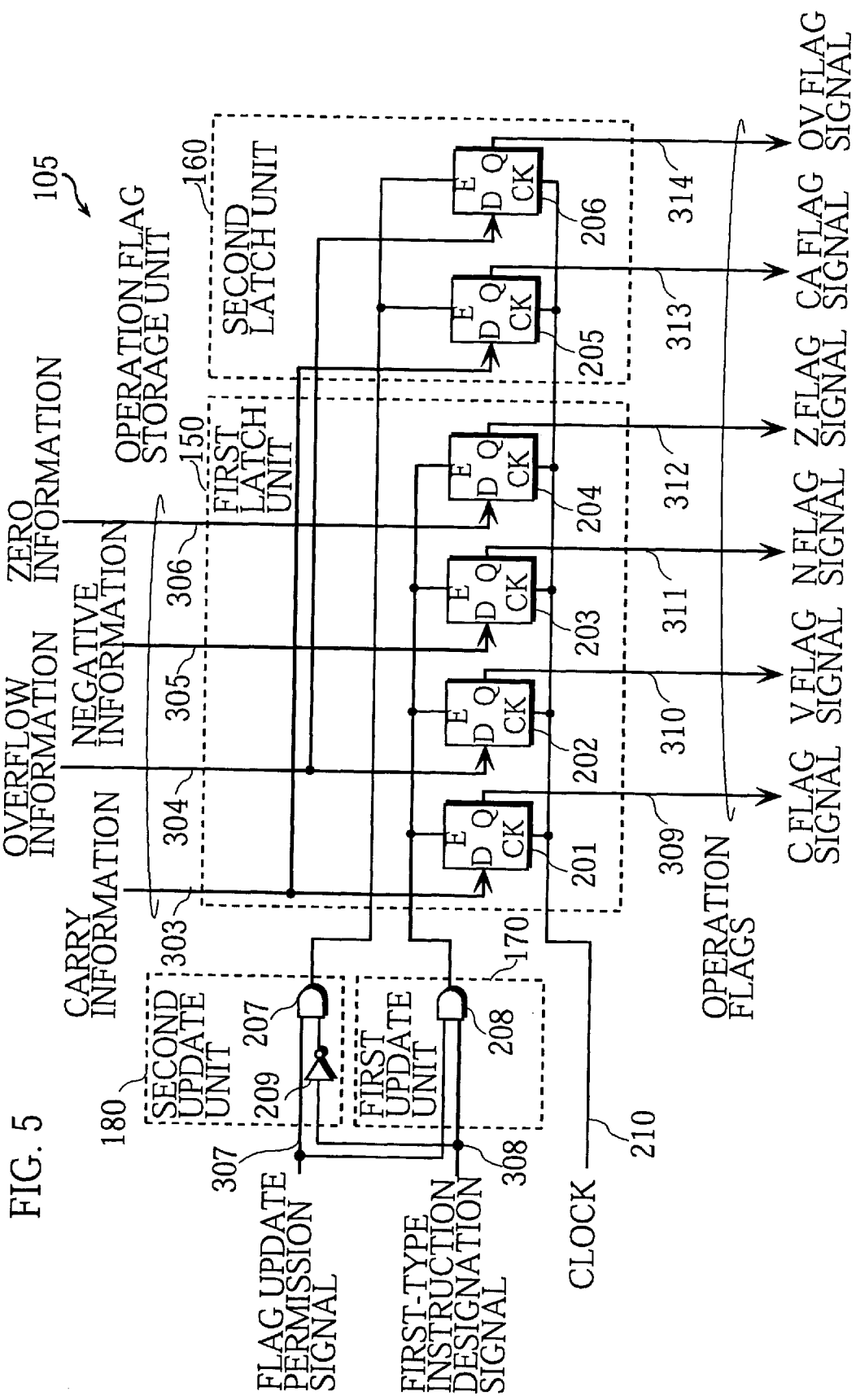
FIG. 5 shows the detailed construction of operation flag storage unit in the processor according to the first embodiment of the present invention.

FIG. 5 is a block diagram showing the internal structure of operation flag storage unit 105 in FIG. 4.

Operation flag storage unit 105 includes first latch unit 150, second latch unit 160, first update unit 170, and second update unit 180. First latch unit 150 and second latch unit 160 are included in flag register FR shown in FIG. 2. Operation flag storage unit 105 also includes latches 201 to 206, AND gates 207 and 208, and inverter 209.

First latch unit 150 includes latches 201 to 204 which each are one bit of latch for storing the first flag group shown in FIG. 2. Latches 201 to 204 that are D-type flip-flops store the C flag, the V flag, the N flag, and the Z flag, respectively. More specifically, flag creation information 303 to 306 are input into the input terminals (represented by "D"s in FIG. 5) of latches 201 to 204, respectively. At the timing of the rising edge of clock 210 that is input into the clock terminals (represented by "CK"s in FIG. 5), each of latches 201 to 204 latches one bit of data that is input into the input terminal only when the value input into the enable terminal (represented by "E" in FIG. 5) is "1", and outputs the latched logical value from the output terminal (represented by "Q" in FIG. 5). The enable signals to latches 201 to 204 are controlled by first update unit 170.

As a result, latch 201 stores carry information 303 as a data input and outputs C flag signal 309. Latch 202 stores overflow information 304 as a data input and outputs V flag signal 310. Latch 203 stores negative information 305 as a data input and outputs N flag signal 311. Latch 204 stores zero information 305 as a data input and outputs Z flag signal 312.

Second latch unit 160 includes latches 205 and 206 which each are one bit of latch for storing the second flag group shown in FIG. 2. Latches 205 and 206 store the CA flag and the OV flag, respectively. Flag creation information 303 and 304 are input into the input terminals (represented by "D"s in FIG. 5) of latches 205 and 206, respectively. The enable signals into enable terminals of latches 205 and 206 are controlled by second update unit 180.

As a result, latch 205 stores carry information 303 as a data input and outputs CA flag signal 313, and latch 206 stores overflow information 304 as a data input and outputs OV flag signal 314.

First update unit 170 includes AND gate 208, and updates first latch unit 150 using flag creation information 303 to 306 when a first-type instruction is executed. More specifically, AND gate 208 makes the enable signals to latches 201 to 204 effective when flag update permission signal 307 and first-type instruction designation signal 308 are effective. When a first-type instruction is executed, first update unit 170 outputs the enable signals so that the C flag, the V flag, the N flag, and the Z flag are updated.

Second update unit 180 includes AND gate 270 and inverter 209, and updates second latch unit 160 using flag creation information 303 and 304 when a second-type instruction is executed. More specifically, AND gate 207 makes the enable signals to latches 205 and 206 effective when flag update permission signal 307 is effective and first-type instruction designation signal 308 is not effective, that is, when the value output from inverter 209 is "1". When a second-type instruction is executed, second update unit 180 outputs the enable signals so that the CA flag and the OV flag are updated.

[Explanation of Operations by Processor]

The operations performed by the processor the construction of which has been described are explained below.

Figure 6:
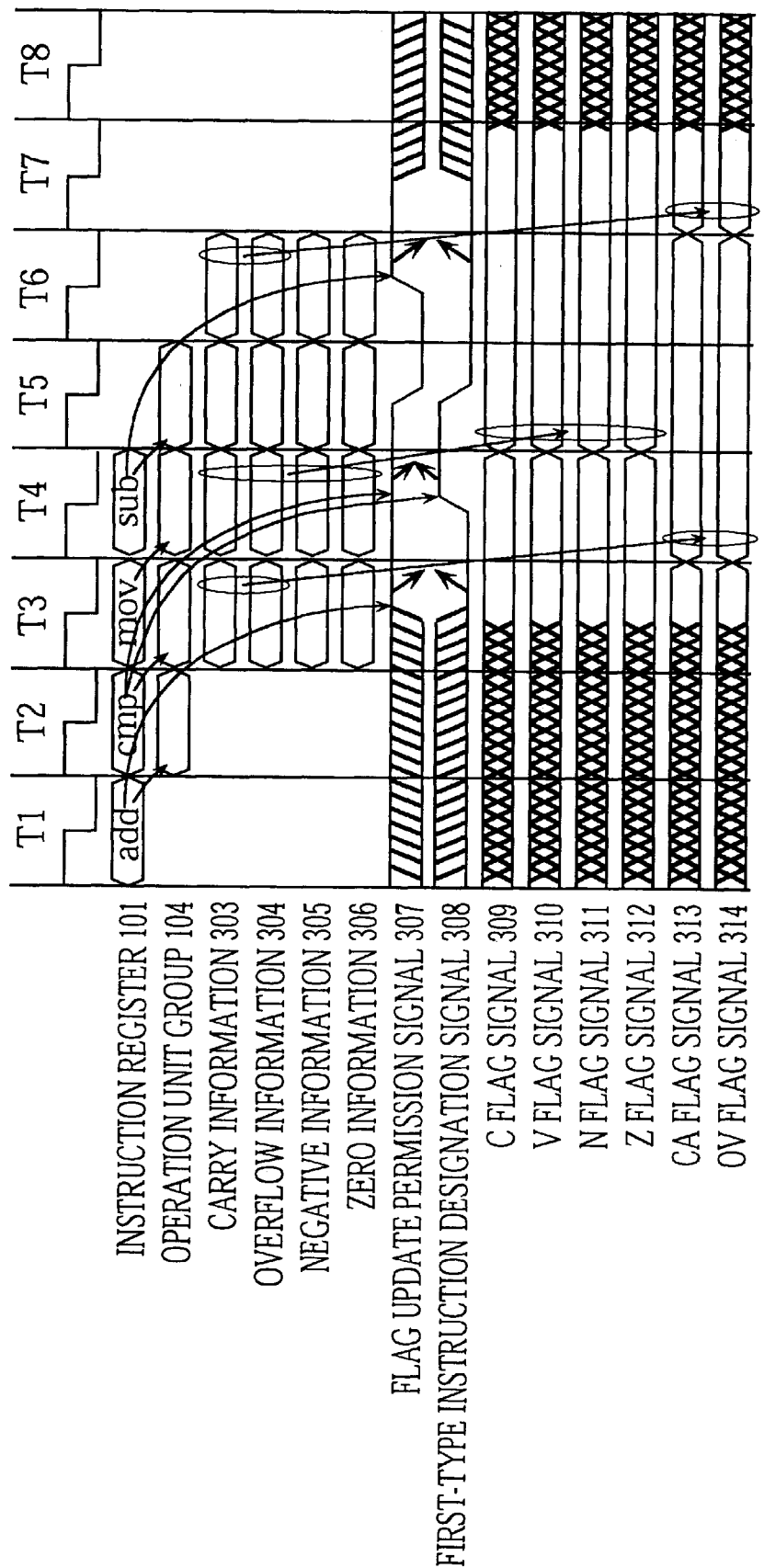
FIG. 6 is a timing chart when a processor according to the first embodiment of the present invention executes an instruction sequence including a first-type instruction and two second-type instructions.

FIG. 6 is a timing chart when the processor executes an instruction sequence including a first-type instruction and two second-type instructions.

FIG. 6 shows the operations when the processor executes the instruction sequence described below.

add D,A,B; a second-type instruction cmp A,B; a first-type instruction mov (A),B; neither a first-type nor second-type instruction sub D,A,B; a second-type instruction Each of "T1" to "T8" represents the period of time corresponding to one machine cycle. Machine cycles T1 to T8 are named in order of time.

[Operations in "add D,A,B"]

The operations by the processor when executing the instruction "add D,A,B" are explained below.

At machine cycle T1, the "add D,A,B" instruction that has been latched in instruction register 101 is decoded by instruction decoder 102. The operation code in the instruction is "add". As a result, instruction decoder 102 outputs control signals so that "an addition is performed at machine cycle T2" for operation unit group 104. The operands in the instruction are "D", "A", and "B". As a result, instruction decoder 102 outputs control signals so that "register data are read from registers A and B for register file 103 at machine cycle T2, and the read register data are input into operation unit group 104, and the result of the addition performed by operation unit group 104 is written into register D".

At machine cycle T2, operation unit group 104 performs an addition, and outputs the result and flag creation information 303 to 306.

At machine cycle T3, flag update permission signal 307 and first-type instruction designation signal 308 that instruction decoder 102 has output are input into operation flag storage unit 105, and operation flag storage unit 105 judges which operation flag should be updated. In this case, the instruction that instruction decoder 102 decodes is an "add" instruction, which is an instruction to update flags, so that flag update permission signal 307 is effective. An "add" instruction is not a first-type instruction, so that first-type instruction designation signal 308 is not effective. As a result, the value output from AND gate 207 is "1" and the value output from AND gate 208 is "0", and only latches 205 and 206 that store the CA flag and the OV flag are enabled.

At machine cycle T4, latches 205 and 206 are enabled at the timing of rising edge of the clock, so that carry information 303 and overflow information 304 that are flag creation information are latched in latches 205 and 206, respectively. As a result, when an "add D,A,B" instruction is performed, only the CA flag and the OV flag in the operation flag register are updated. The C flag, the V flag, the N flag, and the Z flag are not updated.

[Operations in "cmp A,B"]

The operations by the processor when executing the instruction "cmp A,B" are explained below.

At machine cycle T2, the "cmp A,B" instruction that has been latched in instruction register 101 is decoded by instruction decoder 102. The operation code of the instruction is "cmp". As a result, instruction decoder 102 outputs control signals to operation unit group 104 so that operation unit group 104 perform a subtraction at machine cycle T3. The operands in the decoded instruction are "A" and "B". As a result, instruction decoder 102 outputs control signals so that the contents of registers A and B are input into operation unit group 104 from register file 103 at machine cycle T3, and the arithmetic result is not written in any register after the subtraction is performed.

At machine cycle T3, operation unit group 104 performs a subtraction, and outputs flag creation information 303 to 306.

At machine cycle T4, flag update permission signal 307 and first-type instruction designation signal 308 that instruction decoder 102 has output are input into operation flag storage unit 105, and operation flag storage unit 105 judges which operation flag should be updated. In this case, the instruction that instruction decoder 102 decodes is a "cmp" instruction, which is an instruction to update flags, so that flag update permission signal 307 is effective. A "cmp" instruction is a first-type instruction, so that first-type instruction designation signal 308 is also effective. As a result, the value output from AND gate 207 is "0" and the value output from AND gate 208 is "1", and only latches 201 to 204 that store the C flag, the V flag, the N flag, and the Z flag are enabled.

At machine cycle T5, latches 201 to 204 are enabled at the timing of rising edge of the clock, so that flag creation information (carry information 303, overflow information 304, negative information 305, and zero information 306) are latched in latches 201 to 204, respectively. As a result, when a "cmp A,B" instruction is performed, only the C flag, the V flag, the N flag, and the Z flag in the operation flag register are updated. The CA flag and the OV flag are not updated.

[Operations in "mov (A),B"]

The operations by the processor when executing an instruction "mov (A),B" are explained below.

At machine cycle T3, the "mov (A),B" instruction that has been latched in instruction register 101 is decoded by instruction decoder 102. The operation code of the instruction is "mov". As a result, instruction decoder 102 outputs control signals for operation unit group 104 so that operation unit group 104 "perform an address calculation at machine cycle T4". The operands in the decoded instruction are "(A)" and "B". As a result, instruction decoder 102 outputs control signals so that "the data at the address corresponding to the content of register A is read from the memory, and the read data is written in register B for register file 103 at machine cycle T4".

At machine cycle T4, operation unit group 104 performs an address calculation, and outputs flag creation information.

At machine cycle T5, flag update permission signal 307 and first-type instruction designation signal 308 that instruction decoder 102 has output are input into operation flag storage unit 105, and operation flag storage unit 105 judges which operation flag should be updated. In this case, the instruction that instruction decoder 102 decodes is a "mov" instruction, which is an instruction to update no flag, so that flag update permission signal 307 is not effective. A "cmp" instruction is not a first-type instruction, so that first-type instruction designation signal 308 is not effective either. As a result, the values output from AND gate 207 and AND gate 208 are "0", and none of latches 201 to 206 that store the C flag, the V flag, the N flag, the Z flag, the CA flag, and the OV flag is enabled.

At machine cycle T6, none of latches 201 to 206 is enabled at the timing of rising edge of the clock, so that flag creation information is not latched on any of latches 201 to 204. As a result, when a "cmp A,B" instruction is performed, none of the C flag, the V flag, the N flag, the Z flag, the CA flag, and the OV flag in the operation flag register is updated.

[Operations in "sub D,A,B"]

The operations by the processor when executing the instruction "sub D,A,B" are explained below.

At machine cycle T4, the "sub D,A,B" instruction that has been latched in instruction register 101 is decoded by instruction decoder 102. The operation code of the instruction is "sub". As a result, instruction decoder 102 outputs control signals for operation unit group 104 so that operation unit group 104 performs a subtraction. The operands in the decoded instruction are "D", "A", and "B". As a result, instruction decoder 102 outputs control signals so that "the contents of registers A and B are input into operation unit group 104 for register file 103 at machine cycle T5, the arithmetic result is written in register D after the subtraction is performed".

At machine cycle T5, operation unit group 104 performs a subtraction, and outputs the arithmetic result and flag creation information.

At machine cycle T6, flag update permission signal 307 and first-type instruction designation signal 308 that instruction decoder 102 has output are input into operation flag storage unit 105, and operation flag storage unit 105 judges which operation flag should be updated. In this case, the instruction that instruction decoder 102 decodes is "sub", which is an instruction to update flags, so that flag update permission signal 307 is effective. An "sub" instruction is not a first-type instruction, so that first-type instruction designation signal 308 is not effective. As a result, the value output from AND gate 207 is "1" and the value output from AND gate 208 is "0", and only latches 205 and 206 that store the CA flag and the OV flag are enabled.

At machine cycle T7, latches 205 and 206 are enabled at the timing of rising edge of the clock, so that carry information 303 and overflow information 304 that are flag creation information are latched in latches 205 and 206, respectively. As a result, when a "sub D,A,B" instruction is performed, only the CA flag and the OV flag in the operation flag register are updated. The C flag, the V flag, the N flag, and the Z flag are not updated.

[Other Operations]

The N flag and the Z flag that are referred to when the values of data are compared or when data are judged as identical are updated only when a "cmp" instruction is performed. As a result, it is not necessary for a processor according to the present invention to designate a plurality of flag updating methods for one operation. It is possible for such a processor to increase the number of operations assigned to the field for designating the operation when instruction codes are assigned to instructions. It is also possible for such a processor to limit the lengths of instructions and the (code) size of a program.

When the instruction decoder judges whether a first-type instruction (a compare instruction) or a second-type instruction (an arithmetic logic operation instruction), the flag group that should be updated may be determined. As a result, compared to the conventional art in which it is necessary for each instruction to designate the operation flag register that should be updated, the hardware size of the instruction decoder is small. Originally, the instruction decoder includes a circuit for discerning that an instruction that is now being decoded is a first-type instruction. Such a signal output from the circuit may be used for creating a flag. No other signal is necessary for creating a flag. As a result, it is possible to realize the present invention without increasing the hardware size of the instruction decoder.

While a processor according to the present invention has been explained based on the first embodiment, it is clear that the present invention is not limited to the first embodiment.

(1) Four types of operation flags, that is, a C flag, a V flag, an N flag, and a Z flag, are updated when a compare instruction (a first-type instruction) is executed, and two types of operation flags, that is, a CA flag and an OV flag are updated when an instruction apart from compare instructions (a second-type instruction) is executed in the first embodiment. It is possible to update the four types of operation flags when a second-type instruction is executed as a first-type instruction is executed. In this case, the instruction decoder judges only whether the instruction that is now being decoded is a compare instruction. As a result, the hardware size of the instruction decoder does not increase.

It is preferable to update a CA flag and an OV flag in a second-type instruction in practical application.

(2) An "add" instruction, a "sub" instruction, an "and" instruction, and an "or" instruction are classified as a second-type instruction that updates the CA flag and the OV flag in the first embodiment. Other instructions apart from compare instructions, for instance, an arithmetic operation instruction including a multiplication and a divide, a shift instruction, and a bit manipulation instruction may be classified as such a second-type instruction.

(3) In the first embodiment, the C flag, the V flag, the N flag, and the Z flag are updated when a "cmp"instruction is executed, and the CA flag and the OV flag are updated when an "add" instruction is executed and when a "sub" instruction is executed. The combination of instructions may be set freely. The object of the present invention may be realized when the instructions in which the first four flags are updated and the instructions in which the last two flags are updated are mutually exclusive.

It is preferable to divide instructions into compare instructions including a "cmp" instruction and the instructions apart from compare instructions in practical application. Compare instructions also include a bit compare instruction, a bit field compare instruction, and a string compare instruction. The reason why it is preferable to divide instructions into compare instructions and other instructions is that the functions of the flags in compare instructions and in other instructions are different.

(4) A processor that performs instructions each of which, for instance, an "add" instruction or a "cmp"instruction, defines one operation is disclosed in the first embodiment. The present invention may be realized by a processor that performs instructions in the VLIW. A VLIW instruction includes a format field in which a format code indicates the format of the VLIW instruction and a plurality of operation fields in which instruction codes designate the operations performed in parallel. The performance of the processor based on the instructions in the VLIW improves as the number of instructions that are scheduled in the VLIW and performed in parallel increases. As a result, a processor having a flag register that includes duplicate operation flags realized by the present invention is useful in practice.

[The Second Embodiment]

In the second embodiment, the construction of a VLIW processor to which the present invention is applied is explained.

Figure 7:
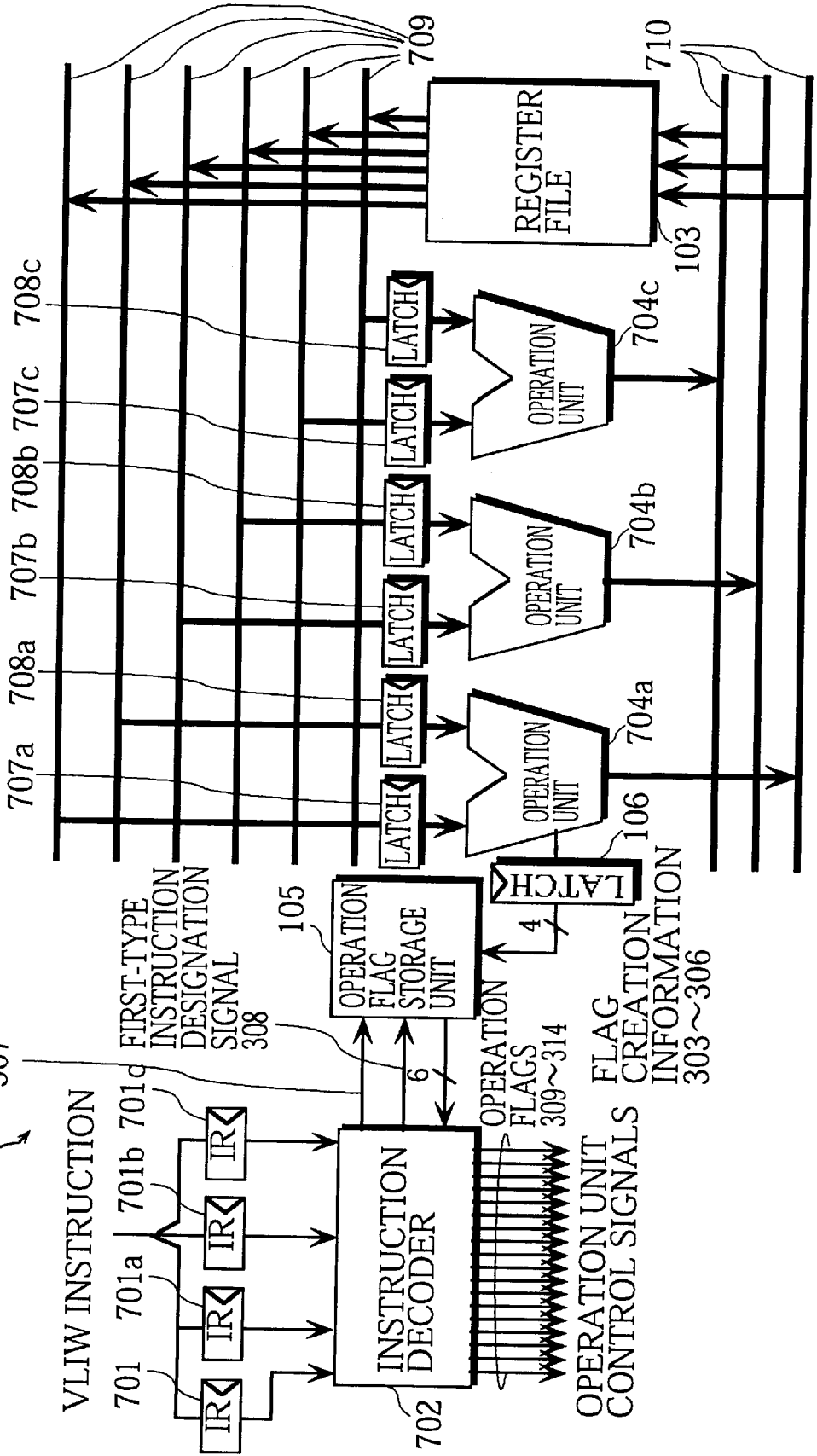
FIG. 7 is a block diagram showing the structure of the main part of a VLIW processor according to the second embodiment of the present invention.

FIG. 7 is a block diagram showing the structure of the main part of VLIW processor 700. VLIW processor 700 performs the instructions shown in FIG. 3, and includes the flag register shown in FIG. 2.

The elements in FIG. 7 to which the same reference numbers are given as in FIG. 4 have the same functions. The explanations focusing on the different elements are given below.

VLIW processor 700 includes instruction registers 701 and 701a to 701c instead of instruction register 101, instruction decoder 702 instead of instruction decoder 102, operation units 704a to 704c instead of operation unit group 104, latches 707a to 707c instead of latches 107 and 108, and buses 709 and 710 instead of buses 109 and 110.

Instruction registers 701 and 701a to 701c stores the VLIW instructions fetched from the memory in order.

A VLIW instruction includes a format field in which a format code indicates the format of the VLIW instruction and a plurality of operation fields (hereinafter, an operation field is called an "instruction field") in which instruction codes indicate the operations performed in parallel. In the second embodiment, a VLIW instruction includes the first to third instruction fields.

The first to third instruction fields correspond to operation units 704a to 704c, respectively. To the first to third instruction fields, the different operations (as shown in FIG. 3) corresponding to operation units 704a to 704c are assigned by a compiler or an assembler.

To the first instruction field, an operation that instructs to perform an arithmetic logic operation, that is, an instruction in compare instruction group 21 and arithmetic logic operation instruction group 22 shown in FIG. 3 is assigned.

To the second instruction field, an operation that instructs to perform a branch, that is, an instruction in first branch instruction group 23 or second branch instruction group 24 shown in FIG. 3 is assigned.

To the third instruction field, an operation that instructs to load and store, that is, an instruction in transfer instruction group 20 shown in FIG. 3 is assigned.

In the format field, effectivenesses and/or ineffectivenesses of the first to third instruction field are indicated.

Instruction register 701 stores a format code. Each of instruction registers 701a to 701c stores an operation (instruction). Hereinafter, the instructions stored in instruction registers 701a to 701c are called an "instruction A", an "instruction B", and an "instruction C", respectively.

Instruction decoder 702 differs from instruction decoder 102 in FIG. 4 in decoding three instructions simultaneously.

Instruction decoder 702 decodes the operations stored in instruction registers 701a to 701c in accordance with the format code stored in instruction register 701, and outputs control signals for controlling the execution of the decoded instructions. At the same time, instruction decoder 702 outputs control signals for creating operation flags for the operation stored in instruction register 701a. On decoding the operation stored in instruction register 701a, instruction decoder 702 makes flag update permission signal 307 that allows operation flags to be updated effective when the decoded operation is a first-type instruction and when the decoded operation is a second-type instruction, and instruction decoder 702 makes first-type instruction designation signal 308 that indicates that the instruction is a first-type instruction effective, when the decoded operation is a first-type instruction.

Operation units 704a to 704c execute three operations stored in instruction registers 701a to 701c in parallel. Operation units 704a to 704c execute different operations. More specifically, operation units 704a to 704c are an arithmetic logic operation unit, a branch unit, and a load/store unit, respectively. In other words, operation unit 704a executes the instructions in compare instruction group 21 and arithmetic logic operation instruction group 22 shown in FIG. 3. Operation unit 704b executes the instructions in first branch instruction group 23 and second branch instruction group 24. Operation unit 704c executes the instructions in transfer instruction group.

The functions of latches 707a, 707b, and 707c, and the functions of latches 708a, 708b, and 708c are the same as latches 107 and 108, respectively.

Buses 709 and 710 input register data into and output register data from three operation units. As a result, the numbers of buses 709 and 710 are larger than the numbers of buses 109 and 110.

[Explanation of Operations by a VLIW Processor]

The operations performed by the VLIW processor the construction of which has been described are explained below.

Figure 8:
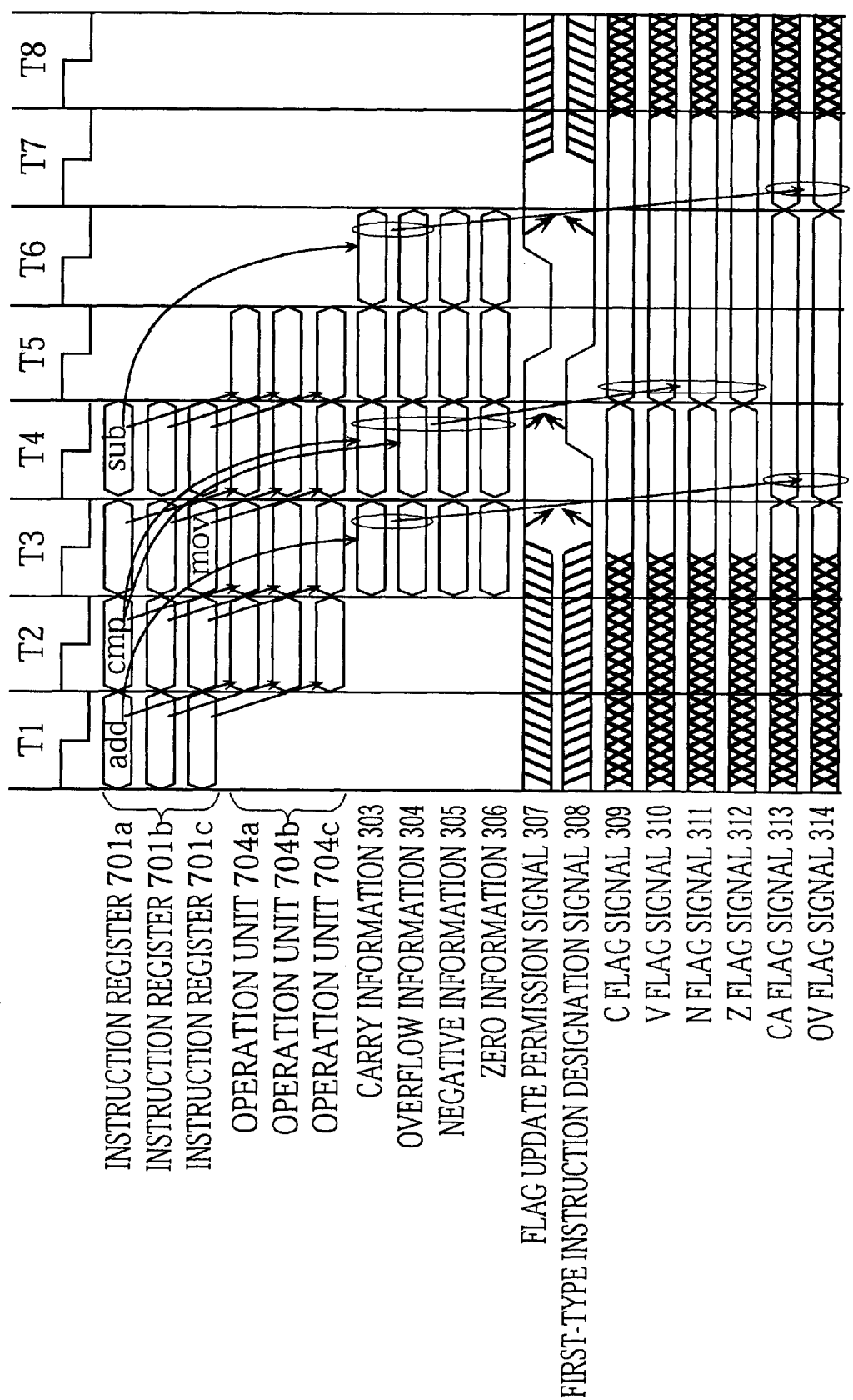
FIG. 8 is a timing chart when a VLIW processor according to the second embodiment of the present invention executes an instruction sequence including first-type and second-type instructions.

FIG. 8 is a timing chart when the VLIW processor according to the second embodiment executes an instruction sequence including first-type and second-type instructions.

FIG. 8 shows the operations when the VLIW processor executes a first instruction sequence that is stored in instruction register 701a and is performed in order.

The first instruction sequence is described below.

add D,A,B; a second-type instruction cmp A,B; a first-type instruction mov (A),B; neither a first-type nor second-type instruction sub D,A,B; a second-type instruction In the VLIW processor, flags are updated by the arithmetic result in operation unit 704a, that is, an instruction A stored in instruction register 701a, but no flags is updated by an instruction B and an instruction C. As a result, the timing of the operations in which operation unit 704a executes instructions A in instruction register 701a in order and flags are updated in operation flag storage unit 105 according to the arithmetic results in operation unit 704a in FIG. 8 is the same as in FIG. 6.

In the VLIW processor that has been described, operation units 704a to 704c execute different operations, and first-type instructions and second-type instructions are executed in operation unit 704a.

When setting instructions in a VLIW instruction, a compiler for the VLIW processor sets an instruction that updates flags in the first instruction field and an instruction that refers to flags in the second instruction field. As a result it is possible for the compiler to set instructions included in a VLIW instruction easily. It is also possible for the compiler to rearrange instructions easily to keep the order of an instruction that updates flags and an instruction that refers to flags.

[The Third Embodiment]

Figure 9:
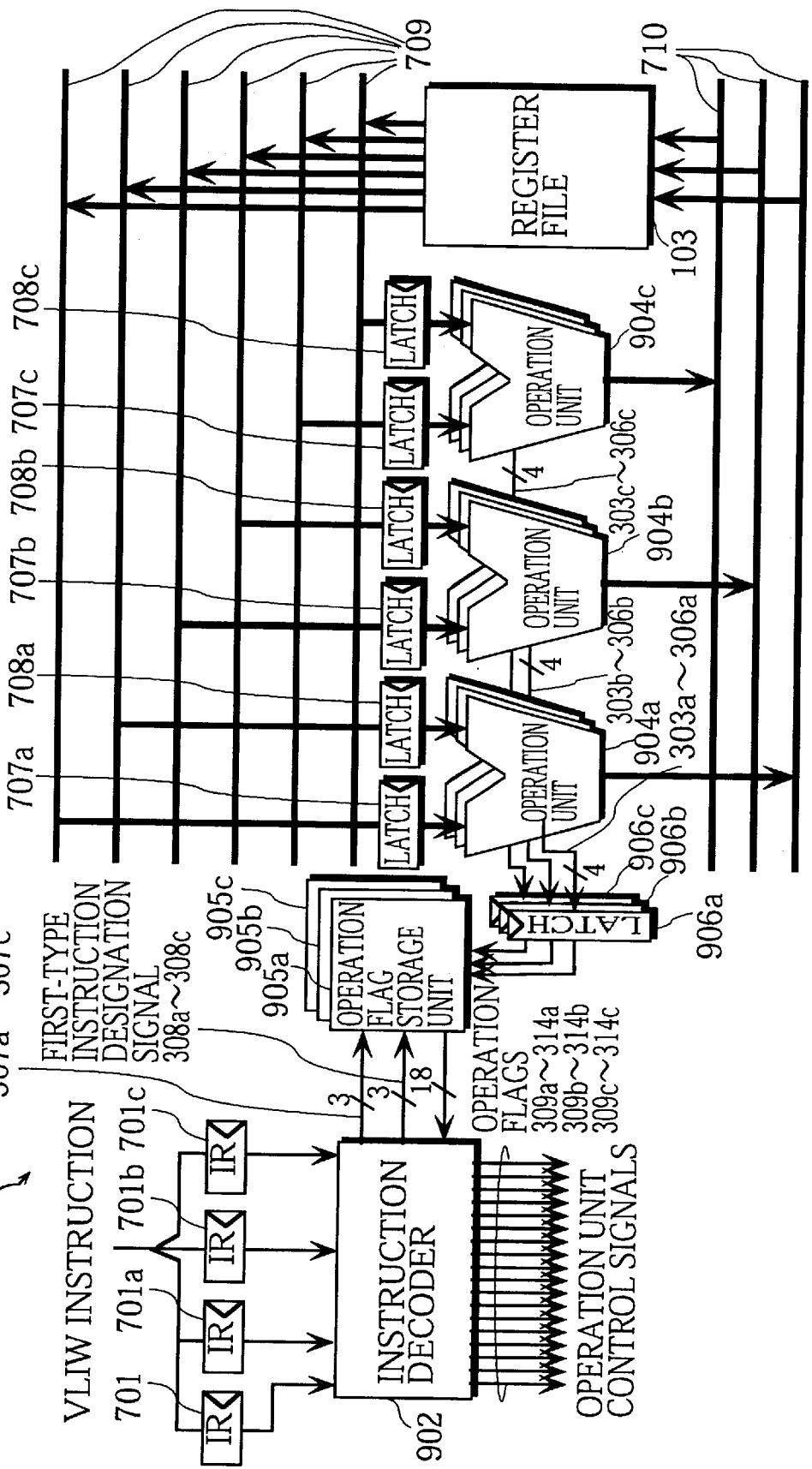
FIG. 9 is a block diagram showing the structure of the main part of a VLIW processor according to the third embodiment of the present invention.

FIG. 9 is a block diagram showing the structure of the main part of VLIW processor 900 in the third embodiment.

The elements in FIG. 9 to which the same reference numbers are given as in FIG. 7 have the same functions. The explanations focusing on the different elements are given below.

A VLIW instruction includes a format field and the first to third format fields as in the second embodiment. In the third embodiment, however, any kind of instruction can be set on the first to third fields. As a result, instruction registers 701a to 701c store any kinds of instructions that the compiler sets.

The VLIW processor 900 differs from the VLIW processor shown in FIG. 7 in the points described below. The VLIW processor 900 includes instruction decoder 902 instead of instruction decoder 702, operation unit groups 904a to 904c instead of operation units 704a to 704c, operation flag storage units 905a to 905c instead of operation flag storage unit 105, and latches 906a to 906c instead of latch 106.

The functions of operation unit groups 904a to 904c are the same as the function of operation unit group 104 in the first embodiment. In other words, each of operation unit groups 904a to 904c includes an arithmetic logic operation unit, a load/store unit, and a shifter. Each of operation unit groups 904a to 904c executes an operation designated by the operation code in an instruction and outputs flag creation information, which is necessary to create operation flags, according to the operation result to operation flag storage units 905a to 905c via latches 906a to 906c under the control of instruction decoder 902. Each piece of flag creation information 303a to 306a, 303b to 306b, and 303c to 306c is four bits of data that includes carry information, overflow information, negative information, and zero information.

While operation units 704a to 704c in the second embodiment execute different operations, each of operation unit groups 904a to 904c in the third embodiment has the same function and executes any operation regardless of the kind of instruction.

Latches 906a to 906c latch flag creation information 303a to 306a, 303b to 306b, and 303c to 306c output from operation unit groups 904a to 904c, and output the flag creation information to operation flag storage units 905a to 905c.

Instruction decoder 902 decodes the instructions stored in instruction registers 701a to 701c according to the format code stored in instruction register 701. It is possible for each of instruction registers 701a to 701c to store an instruction that updates flags (a first-type or a second-type instruction), so that instruction decoder 902 corresponds to three instruction decoders 102. When decoding the instructions that update flags and are stored in instruction registers 701a to 701c, instruction decoder 902 outputs flag update signals 307a to 307c and first-type instruction designation signals 308a to 308c to operation flag storage units 905a to 905c.

Operation flag storage units 905a to 905c correspond to operation unit groups 904a to 904c, respectively, and have the same construction as operation flag storage unit 105 shown in FIG. 5. As a result, each of operation flag storage units 905a to 905c corresponding to operation unit groups 904a to 904c includes a flag register shown in FIG. 2.

[Explanation of Operations by VLIW Processor 900]

VLIW Processor 900 includes operation flag storage units 905a to 905c corresponding to operation unit groups 904a to 904c, respectively. The operation of each of operation flag storage units 905a to 905c is the same as shown in FIG. 6.

VLIW processor 900 includes a flag register for each of the operation unit groups. As a result, it is possible for the compiler in VLIW processor 900 to schedule instructions so that an instruction that updates flags and an instruction that refers to flags are simultaneously executed in a pair by an operation unit group. A VLIW instruction includes three instructions. As a result, it is possible for the compiler to schedule instructions so that three pairs of such instructions are simultaneously executed by the operation unit groups. After all, it is easy for the compiler to schedule instructions.

While VLIW processor 900 includes three flag registers in the third embodiment, it is possible for VLIW processor 900 to include only operation flag storage unit 905a and updates flags using the flag creation information output from operation unit groups 904a to 904c. In this case, operation unit groups need to have priority rankings so that an instruction in which more than one flag groups are updated may be executed. The compiler needs to discern the operation unit group that executes an instruction to update flags and the operation unit group that executes an instruction to refer to flags when scheduling instructions.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A processor comprising:
   a flag register for storing a first flag group and a second flag group, the second flag group including operation flags of same kinds as operation flags in the first flag group,
   the processor executing a first-type instruction that instructs a first operation to update the first flag group according to a result of the first operation and a second-type instruction that instructs a second operation different from the first operation to update the second flag group according to a result of the second operation, wherein
      first-type instructions include compare instructions that compare register data, and
      second-type instructions include arithmetic logic operation instructions and no compare instruction, and wherein
         either the first flag group or the second flag group is updated at one execution of an instruction in response to a first-type instruction or a second-type instruction, respectively.

2. The processor according to claim 1, wherein the second flag group includes a carry flag and an overflow flag as the operation flags of the same kinds as the operation flags in the first flag group.

3. The processor according to one of the claims 1 or 2 executes a first-type conditional branch instruction that branches when a operation flag in the first flag group satisfies a condition and a second-type conditional branch instruction that branches when an operation flag in the second flag group satisfies a condition.

4. A processor comprising:
   a flag register for storing a first flag group and a second flag group that includes same kinds of operation flags as the first flag group;
   instruction decoding unit for decoding at least two types of instructions, a first-type instruction and a second-type instruction, wherein operations in the first-type and the second-type instructions are different;
   execution unit for executing an instruction according to a decoding result and for creating flag data based on an execution result of the instruction;
   first update unit for updating, when the first-type instruction has been decoded, the first flag group using the created flag data; and
   second update unit for updating, when the second-type instruction has been decoded, the second flag group using the created flag data, wherein
      first-type instructions include compare instructions that compare register data, and
      second-type instructions include arithmetic logic operation instructions and no compare instruction, and wherein
         either the first flag group or the second flag group is updated at one execution of an instruction in response to a first-type instruction or a second-type instruction, respectively.

5. The processor according to claim 4, wherein the second flag group includes a carry flag and an overflow flag as the operation flags of the same kinds as the operation flags in the first flag group.

6. The processor according to claim 4, wherein
   the instruction decoding unit activates a flag update signal when decoding an instruction that updates an operation flag, and when decoding the first-type instruction, activates a first-type signal that indicates that a decoded instruction is the first-type instruction,
   the first update unit updates the second flag group when the flag update signal and the first-type signal are activated, and
   the second update unit updates the second flag group when the flag update signal is activated and the first-type signal is not activated.

7. The processor according to one of claims 4 to 6 further comprising a branch judgment unit for judging, when the first-type conditional branch instruction has been decoded, a condition using the first flag group, and for judging, when the second-type conditional branch instruction has been decoded, a condition using the second flag group.

8. A processor comprising:
   a flag register for storing a first flag group and a second flag group that includes same kinds of operation flags as the first flag group;
   instruction decoding means for decoding a Very Long Instruction Word (called "VLIW" hereinafter) instruction that includes a format code field and a plurality of instruction fields, wherein a first-type instruction and a second-type instruction are located in a predetermined instruction field in the VLIW instruction;
   a plurality of execution means for executing a plurality of instructions in the VLIW instruction according to a decoding result, wherein execution means respectively corresponding to the predetermined instruction field create flag data based on results of the first-type and second-type instructions;
   first update means for updating, when the first-type instruction in the predetermined instruction field has been decoded, the first flag group using flag data created from a result of the first-type instruction; and
   second update means for updating, when the second-type instruction in the predetermined instruction field has been decoded, the second flag group using flag data created from a result of the second-type instruction, wherein first-type instructions include compare instructions that compare register data, and second-type instructions include arithmetic logic operation instructions and no compare instruction, and wherein either the first flag group or the second flag group is updated at one execution of an instruction in response to a first-type instruction or a second-type instruction, respectively.

9. The processor according to claim 8, wherein the second flag group includes a carry flag and an overflow flag as the operation flags of the same kinds as the operation flags in the first flag group.

10. The processor according to claim 8, wherein the instruction decoding unit activates a flag update signal when decoding an instruction that updates an operation flag, and when decoding the first-type instruction, activates a first-type signal that indicates that a decoded instruction is the first-type instruction, the first update unit updates the first flag group when the flag update signal and the first-type signal are activated, and the second update unit updates the second flag group when the flag update signal is activated and the first-type is not activated.

11. The processor according to one of the claims 8 to 10 further comprising a branch judgment unit for judging, when the first-type conditional branch instruction has been decoded, a condition using the first flag group, and for judging, when the second-type conditional branch instruction has been decoded, a condition using the second flag group.

12. A processor comprising:

a plurality of flag registers, each of which stores a first flag group and a second flag group, the second flag group including operation flags of same kinds as operation flags in the first group;

instruction decoding means for decoding a Very Long Instruction Word (called "VLIW" hereinafter) instruction that includes a format code field and a plurality of instruction fields;

a plurality of execution means a number of which is equal to a number of the plurality of instruction fields, each of the plurality of execution means corresponds to a different one of the plurality of instruction fields, wherein each of the plurality of execution means executes an instruction in a corresponding instruction field according to a decoding result and creates flag data based on an execution result of the instruction;

a plurality of first update means a number of which is equal to or smaller than a number of the plurality of execution means and is equal to a number of the plurality of flag registers, each of the plurality of first update means corresponds to a different one of the plurality of flag registers, wherein each of the plurality of first update means corresponds to a different execution means and, when a first-type instruction in a corresponding instruction field has been decoded, updates the first flag group using flag data created from an execution result of the first-type instruction; and a plurality of second update means, a number of which is equal to or smaller than a number of the plurality of execution means and is equal to a number of the plurality of flag registers, each of the plurality of second update means corresponds to a different one of the plurality of flag registers, wherein each of the plurality of second update means corresponds to a different execution means and, when a second-type instruction in a corresponding instruction field has been decoded, updates the second flag group using a flag data created from an execution result of the second-type instruction.

13. The processor according to claim 12, wherein first-type instructions include compare instructions that compare register data, and second-type instructions include arithmetic logic operation instructions and no compare instruction.

14. The processor according to claim 12, wherein the second flag group includes a carry flag and an overflow flag as the operation flags of the same kinds as the operation flags in the first flag group.

15. The processor according to claim 12, wherein the instruction decoding means activates a flag update signal when decoding an instruction that updates an operation flag, and when decoding the first-type instruction, activates a first-type signal that indicates that a decoded instruction is the first-type instruction, the first update means updates the first flag group when the flag update signal and the first-type signal are activated, and the second update means updates the second flag group when the flag update signal is activated and the first-type signal is not activated.

16. The processor according to claim 12 further comprising branch judgement means for judging, when the first-type conditional branch instruction has been decoded, a condition using the first flag group, and for judging, when the second-type conditional branch instruction has been decoded, a condition using the second flag group.

17. The processor according to claim 1 executes a first-type conditional branch instruction that branches when an operation flag in the first flag group satisfies a condition and a second-type conditional branch instruction that branches when an operation flag in the second flag group satisfies a condition.

18. The processor according to claim 2 executes a first-type conditional branch instruction that branches when an operation flag in the first flag group satisfies a condition and a second-type conditional branch instruction that branches when an operation flag in the second flag group satisfies a condition.

19. The processor according to claim 4 further comprising branch judgment means for judging, when the first-type conditional branch instruction has been decoded, a condition using the first user flag group, and for judging, when the second-type conditional branch instruction has been decoded, a condition using the second flag group.

20. The processor according to claim 5 further comprising branch judgment means for judging, when the first-type conditional branch instruction has been decoded, a condition using the first user flag group, and for judging, when the second-type conditional branch instruction has been decoded, a condition using the second flag group.

21. The processor according to claim 6 further comprising branch judgment means for judging, when the first-type conditional branch instruction has been decoded, a condition using the first user flag group, and for judging, when the second-type conditional branch instruction has been decoded, a condition using the second flag group.

22. The processor according to claim 13 further comprising branch judgment means for judging, when the first-type conditional branch instruction has been decoded, a condition using the first flag group, and for judging, when the second type conditional branch instruction has been decoded, a condition using the second flag group.

23. The processor according to claim 14 further comprising branch judgment means for judging, when the first-type conditional branch instruction has been decoded, a condition using the first flag group, and for judging, when the second type conditional branch instruction has been decoded, a condition using the second flag group.

24. The processor according to claim 15 further comprising branch judgment means for judging, when the first-type conditional branch instruction has been decoded, a condition using the first flag group, and for judging, when the second type conditional branch instruction has been decoded, a condition using the second flag group.

25. A processor comprising:

a flag register for storing a first flag group and a second flag group, the second flag group including operation flags of same kinds as operation flags in the first flag group;

the processor executing a first-type instruction that instructs a first operation to update the first flag group according to a result of the first operation and a second-type instruction that instructs a second operation different from the first operation to update the second flag group according to a result of the second operation;

first-type instructions include compare instructions that compare register data; and, second-type instructions include arithmetic logic operation instructions and no compare instruction.

26. A processor comprising:

a. a flag register for storing a first flag group and a second flag group that includes same kinds of operation flags as the first flag group;

b. instruction decoding unit for decoding at least two types of instructions, a first-type instruction and a second-type instruction, wherein operations in the first-type and the second-type instructions are different;

c. execution unit for executing an instruction according to a decoding result and for creating flag data based on an execution result of the instruction;

d. first update unit for updating, when the first-type instruction has been decoded, the first flag group using the created flag data;

e. second update means for updating, when the second-type instruction has been decoded, the second flag group using the created flag data;

f. first type instructions include compare instructions that compare register data; and, g. second type instructions that include arithmetic logic operation instructions and no compare instruction.

27. A processor comprising:

a flag register for storing a first flag group and a second flag group that includes same kinds of operation flags as the first flag group;

instruction decoding means for decoding a Very Long Instruction Word (called "VLIW" hereinafter) instruction that includes a format code field and a plurality of instruction fields, wherein a first-type instruction and a second-type instruction are located in a predetermined instruction field in the VLIW instruction;

a plurality of execution means for executing a plurality of instructions in the VLIW instruction according to a decoding result, wherein execution means respectively corresponding to the predetermined instruction field create flag data based on results of the first-type and second-type instructions;

first update means for updating, when the first-type instruction in the predetermined instruction field has been decoded, the first flag group using flag data created from a result of the first-type instruction;

second update means for updating, when the second-type instruction in the predetermined instruction field has been decoded, the second flag group using flag data created from a result of the second-type instruction;

first-type instructions include compare instructions that compare register data; and, second-type instructions include arithmetic logic operation instructions and no compare instruction.

* * * * *